United States Patent [19]
Finch et al.

[11] Patent Number: 5,513,319
[45] Date of Patent: Apr. 30, 1996

[54] WATCHDOG TIMER FOR COMPUTER SYSTEM RESET

[75] Inventors: Richard Finch; Eric Schieve, both of Austin, Tex.

[73] Assignee: Dell USA, L.P., Austin, Tex.

[21] Appl. No.: 488,708

[22] Filed: Jun. 8, 1995

Related U.S. Application Data

[63] Continuation of Ser. No. 86,962, Jul. 2, 1993, abandoned.

[51] Int. Cl.$^6$ ..................................................... G06F 11/34
[52] U.S. Cl. ........................... 395/185.08; 364/267.9; 364/DIG. 1
[58] Field of Search ................. 395/185.04, 185.08, 395/182.21, 183.10; 364/260.8, 261.8, 267.2, 267.9

[56] References Cited

U.S. PATENT DOCUMENTS

| | | |
|---|---|---|
| 4,594,685 | 6/1986 | Owens .................................. 364/900 |
| 4,763,296 | 8/1988 | Gercekci .............................. 364/900 |
| 4,775,957 | 10/1988 | Yakuwa et al. ..................... 364/900 |
| 4,796,211 | 1/1989 | Yokuchi et al. ..................... 371/62 |
| 4,809,280 | 2/1989 | Shonaka ............................... 371/62 |
| 4,811,200 | 3/1989 | Wagner et al. ..................... 364/200 |
| 4,879,647 | 11/1989 | Yazawa ............................... 364/200 |
| 4,897,860 | 1/1990 | Lee et al. . | |
| 4,912,708 | 3/1990 | Wendt ................................. 371/16.3 |
| 4,956,842 | 9/1990 | Said ..................................... 371/16.3 |
| 5,048,017 | 9/1991 | Breneman ........................... 371/16.3 |
| 5,081,625 | 1/1992 | Rhee et al. ........................... 371/16.3 |
| 5,123,018 | 6/1992 | Peterson ............................. 371/16.3 |
| 5,155,846 | 10/1992 | Mino .................................... 395/575 |
| 5,247,163 | 9/1993 | Ohno et al. ......................... 371/16.3 |
| 5,278,976 | 1/1994 | Wu ....................................... 395/575 |
| 5,333,285 | 7/1994 | Drerup ................................. 395/575 |

FOREIGN PATENT DOCUMENTS

| | | | |
|---|---|---|---|
| 168204 | 7/1987 | Japan | G05B 23/02 |
| 248245 | 10/1989 | Japan | G06F 11/30 |
| 025149 | 1/1990 | Japan | G06F 11/30 |
| 281367 | 11/1990 | Japan | G06F 15/16 |

*Primary Examiner*—Robert W. Beausoliel, Jr.
*Assistant Examiner*—Albert Decady
*Attorney, Agent, or Firm*—Henry Garrana; Michelle Turner

[57] ABSTRACT

A watchdog timer circuit of the present invention monitors a computer system (S) during diagnostic testing and resets the system when it is nonfunctioning. A real-time clock (RTC) (21), programmed by a central processing unit (CPU) (29) to run for a period of time, produces a reset signal after the period of time elapses. Typically this time period relates to a diagnostic program being run. The reset signal serves as an input to reset circuitry (28) which immediately transmits a nonmaskable interrupt (NMI) to the CPU (29) and, after a delay period, transmits a hardware reset signal to the CPU (29). When functioning properly, the CPU (29) prepares for the hardware reset signal that is produced by the reset circuitry (28) and avoids being reset by the hardware reset signal. However, when the CPU (29) is not functioning properly, the hardware reset signal resets the CPU (29). Additional circuitry stores information regarding where the system (S) failed during the diagnostic testing and retrieves such information for the user upon reset. An additional feature resets all of the components within the system (S) upon a CPU (29) reset via power reset circuitry.

32 Claims, 4 Drawing Sheets

WATCHDOG TIMER FOR COMPUTER SYSTEM RESET

CROSS REFERENCE TO THE RELATED APPLICATIONS

This is a continuation of U.S. Ser. No. 08/086,962 filed Jul. 2, 1993, now abandoned.

TECHNICAL FIELD OF THE INVENTION

The present invention is directed, in general, to diagnostic procedures operable on computer systems and, more particularly, to error recovery circuits for personal computers.

BACKGROUND OF THE INVENTION

For computer systems in general and for personal computers ("PCs") in particular, it is most helpful for the computer itself to provide an indication of the specific location and nature of faults that occur therein to inform the user of an existence of a fault and to more quickly isolate and economically repair the fault. To that end, current PCs are typically equipped with some form of internal diagnostics, the purpose of which is detection and subsequent isolation of component faults within the PC architecture.

Diagnostic routines consist of a series of instructions executed by the central processing unit ("CPU") within the computer system to allow self-diagnosis. For years, computers have been provided with diagnostic routines that test and report on the operational status or functionality of components within the computer, allowing an interested party to repair or replace components that are not functioning to the desired degree.

Each diagnostic routine is designed to test a particular component of the computer system, such as a central processing unit ("CPU"), an interrupt handler, data, address and control buses, a bus controller, a main and cache memory subsystem, a video subsystem, disk drives and their controllers and so forth, until the computer system has been tested thoroughly. Typically, each diagnostic routine is designed to test each component in as isolated a fashion as possible and with minimal dependence on the correct functioning of other, perhaps faulty hardware. Each diagnostic routine places its chosen component through a relatively grueling procedure designed to elicit faults that may not be immediately apparent during normal operation of the computer system. This is because normal operation of a component may not "stress" the component to the same extent as does the diagnostic routine.

Under many circumstances, diagnostic routines perform their function normally and report to the user the fault, if any, with a particular component. However, there may be occasions on which a fault within the component or other components employed during execution of a particular diagnostic routine keeps the diagnostic routine from executing. Failure to execute may be due to one of a number of reasons. First, the CPU itself may "lock up," trapped in an endless loop or stalled, unable to execute instructions. Alternatively, a faulty component may corrupt the data, address or control buses within the computer system, flooding the buses with worthless data and preventing operation of the buses and of the computer system as a whole.

In prior art systems, if a CPU locks up during execution of a diagnostic routine, the user has to ascertain, by looking at the computer screen, listening to tones generated by a speaker coupled to the computer, listening to the whir of disk drives or through other experience that a problem has occurred and the identity of the component that caused the problem.

Unfortunately, failure of some components can fill the screen with gibberish, rendering it useless. Further, at the execution and display speed of today's PCs, the screen may scroll too quickly for the user to read the information thereon.

In an attempt to rectify the above-noted problem, some prior art computer systems provide a watchdog timer within the system to time execution of a particular diagnostic routine. In those systems, if the particular diagnostic routine being executed takes longer to execute than a certain maximum expected execution time, the watchdog timer expires and sends an interrupt to the CPU, the CPU being responsible for vectoring execution to an error-trapping routine of some sort.

Unfortunately, as noted above, some component faults prevent the CPU itself from operating. Therefore, generation of an interrupt to a nonfunctioning CPU by a conventional prior art watchdog timer does nothing to restore operation of the system. Rather, the PC remains in its non-functional state until the user manually resets or "reboots" the PC. Typically, the user does this by pressing a dedicated hardware reset button on the computer or by discontinuing and reapplying line power to the computer.

Although the user's intervention is sufficient to restore the computer's operation, the user is still left with incomplete evidence as to the cause of the computer's lock up. Thus, the user is left with the prospect of re-executing the diagnostic routines and watching their progress more carefully so as to obtain a more complete picture as to the nature of the fault, perhaps having to undergo efforts to restart the computer upon triggering of the fault again.

Accordingly, the prior art has failed to provide a means by which a locked-up computer can be restarted automatically, without user intervention. In addition, the art has yet to provide a means by which the computer itself can identify, with some particularity, the diagnostic routine executed when the computer was rendered nonfunctional.

SUMMARY OF THE INVENTION

Accordingly, it is a primary object of the present invention to provide a circuit and method for initiating a hardware reset of a computer system when a watchdog timer within the computer system times out during execution of a diagnostic routine, the timeout representing failure of execution of the diagnostic routine.

Accordingly, in the attainment of the above-noted primary object, the present invention provides a circuit comprising: (1) a watchdog timer coupled to a CPU within the computer system to enable the watchdog timer to receive a start signal from the CPU indicating that the CPU is beginning execution of a particular task, the watchdog timer beginning to measure a preselected period of time upon receipt of the start signal and generating a timeout signal upon expiration of the preselected period of time and (2) a reset signal generating circuit capable of receiving the timeout signal from the watchdog timer and providing, in response thereto, a reset signal to a reset circuit coupled to the CPU to thereby allow the reset circuit to initiate a reset of the CPU when the computer system is non-functioning.

A key feature of the present invention is that the circuit provides for a hardware reset of the computer system when the watchdog timer times out. This is in stark contrast to the prior art system wherein a simple interrupt is sent to the CPU. In the present invention, the circuit is empowered to initiate a hardware reset of the entire computer system, including the CPU, when the CPU has ceased to function properly.

It is a further object of the present invention to provide an indication of the diagnostic routine that was being executed when the watchdog timer timed out. Accordingly, the present invention provides for a storage location within the computer system that is capable of storing identification data concerning a diagnostic routine that is about to be executed. If the watchdog timer times out during execution of the diagnostic routine and initiates a hardware reset of the computer system, the identification data within the storage location remains intact, allowing the CPU to read the identification data to further diagnosis of the fault. During the diagnostic process, the user may initiate a hardware reset of the system in a manner to be described later without any CPU lockup occurring. It is important, therefore, that the circuit of the present invention be able to indicate to the CPU, after the CPU has been reset, whether or not the hardware reset occurred by virtue of timeout of the watchdog timer. Accordingly, the present invention also contemplates storage of timeout data in the storage location, the timeout data indicating to the CPU, following hardware reset, whether the hardware reset is due to failure of a diagnostic routine to properly execute or to some other cause for the hardware reset.

As stated previously, when a particular diagnostic routine is to be executed, the CPU sends identification data pertaining to that diagnostic routine to the storage location. The CPU then loads a value into the watchdog timer, the value representing a preselected maximum execution period of time of the diagnostic routine. In other words, if the diagnostic routine takes longer than the preselected time to execute, it is assumed that the diagnostic routine is not executing properly and that the computer system is nonfunctioning. Finally, the CPU transmits a start signal to the watchdog timer to allow the watchdog timer to begin measuring the preselected period of time.

Yet another object of the present invention is to use, as much as possible, the circuitry that already exists within the computer, thereby avoiding the addition of costly dedicated diagnostic reset hardware. Accordingly, the present invention employs an existing real time clock within the computer system as the watchdog timer. Normally, the real time clock issues a maskable interrupt directly to the CPU via a particular interrupt line. The present invention taps into that line, feeding it into existing hardware reset circuitry within the computer system. This allows the real time clock to directly initiate operation of the hardware reset circuitry when the preselected period of time expires. The hardware reset circuitry generates a reset signal in the form of a nonmaskable interrupt, beginning an otherwise conventional hardware reset of the entire computer system, including the CPU, as though the user has reset the system manually. Thus, the present invention adds minimal hardware to the computer, thereby minimally increasing the marginal cost of the system as a whole.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
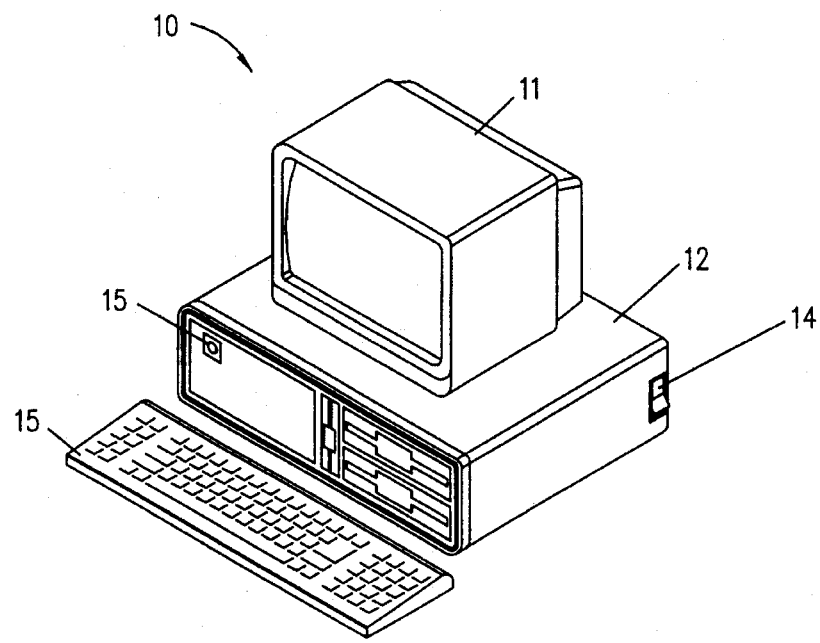
FIG. 1 illustrates an isometric view of a personal computer that provides an environment within which the present invention can operate.

Referring initially to FIG. 1, illustrated is an isometric view of a PC 10 that provides an environment within which the present invention can operate. Since the present invention is not limited to application in a personal computer ("PC") environment, however, FIG. 1 is illustrative only. The PC 10 includes a monitor 11, a main chassis 12, within which are various electronic components of the computer (not shown) and a keyboard 15. The monitor 11 and the keyboard 15 cooperate to allow communication between the PC 10 and a user. The main chassis 12 includes a dedicated hardware reset switch 13 adapted to trigger hardware reset circuitry within the computer chassis (not shown in FIG. 1) to "reboot" or restart the computer when the user depresses the reset switch 13. The computer chassis 12 further includes a power switch 14 that is capable of interrupting power to the PC 10. Interruption and restoration of power also brings about a restart of the personal computer 10.

Figure 2:
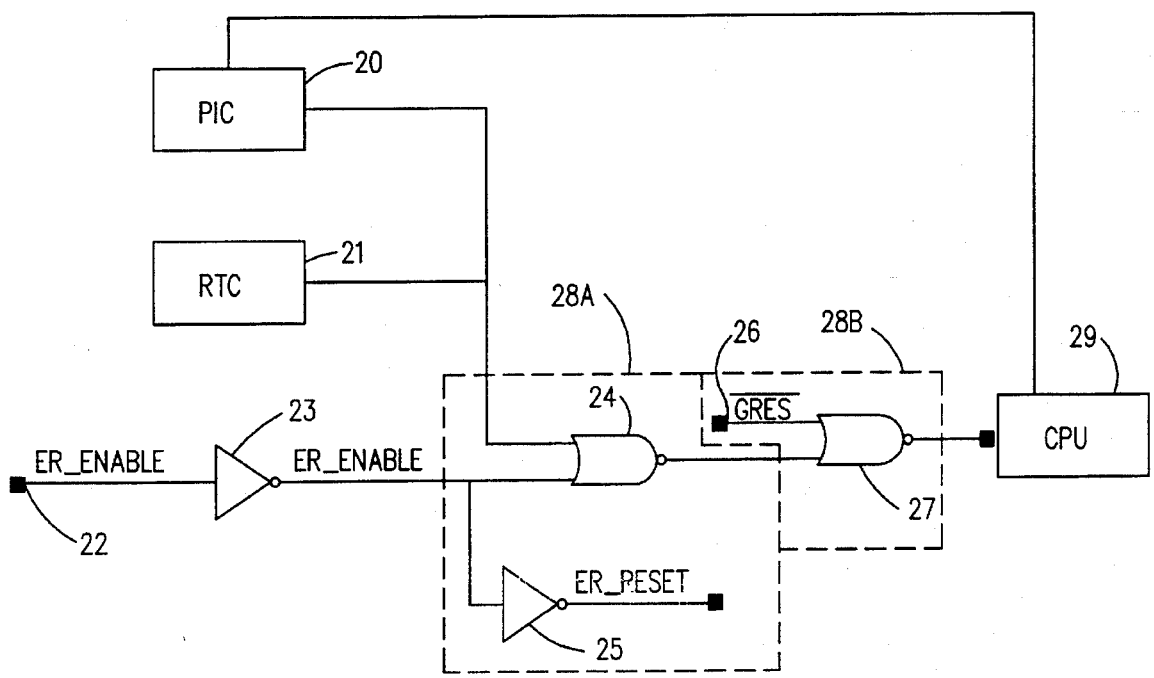
FIG. 2 illustrates a block circuit diagram of the present invention.

Turning now to FIG. 2, illustrated is a block circuit diagram of the present invention. Shown are a programmable interrupt controller ("PIC") 20 and a real time clock ("RTC") 21. The PIC 20 is responsible for receiving maskable interrupts destined for a central processing unit ("CPU") 29 of the PC 10.

In the illustrative PC 10, there are two timers that the present invention can use. The first is a system timer. However, the system timer is designed to time periods of no more than 55 milliseconds. This is typically not long enough for execution of diagnostic routines. The RTC, on the other hand, can be programmed to measure a period of time of several hours, which is quite sufficient for execution of diagnostic routines.

The RTC 21 is designed to be loaded with a value representing a desired period of time. The RTC is then started and automatically measures the period of time, generating a signal when the period of time elapses or expires ("times out"). The RTC 21 is conventionally coupled to the PIC 20 via a maskable interrupt request line (IRQ8, in IBM compatible PCs) to allow the RTC 21 to generate a maskable interrupt to the PIC 20 when the RTC 21 times out. The present invention further feeds the IRQ8 output of the RTC 21 to reset signal generating circuitry 28A, comprising a OR gate 24 and a NOT gate 25, acting as a signal inverter.

The present invention begins to operate when the PC 10 begins a particular diagnostic routine. The CPU 29 loads a value representing a particular period of time into the RTC 21, the particular period of time sufficient to allow the CPU to execute the particular diagnostic routine. At the same time, the CPU 29 enables an error recovery ("ER") signal that enables the RTC 21 to initiate a hardware reset if it times out. The ER signal is entered at point 22 and inverted in a NOT gate 23. If the RTC 21 times out, its output goes low (active) and, when combined with the active low ER signal, causes the output of the OR gate 24 to go active low. The output of the OR gate 24 is fed into the CPU 29.

The programmable interrupt controller ("PIC") 20 is adapted to produce a nonmaskable interrupt that triggers a hardware reset of the PC 10 of FIG. 1. It is outside the scope of the present invention to detail the conditions under which the PIC 20 initiates a hardware reset of the PC 10. The functioning of the PIC is conventional. The present invention is enabled in this PC architecture by coupling an output on a real time clock ("RTC") 21 to a reset circuit 28B.

The reset circuit 28B is adapted to receive an input from not only the reset signal generating circuit 28A, but also from the dedicated hardware reset button 13 of FIG. 1, fed into an input 26 of a NAND gate 27. If either the reset button 13 or the reset signal generating circuit 28A is enabled, the NAND gate 27 produces a reset signal that goes directly to the CPU 29, bypassing the PIC 20. Once the CPU 29 receives the reset signal, the CPU 29 initiates a reset sequence, to be described below.

The output from the OR gate 24 is also provided to the NOT gate 25 wherein it is inverted high and provided as an ER RESET bit to a read-only storage location that is designed to retain the ER RESET bit through system reset to allow it to be read following reset to determine the cause of the reset.

Because the NAND gate 27 is able to initiate a reset of the CPU 29 upon the occurence of either a manual press of the reset button 13 or expiration of the RTC 21, the CPU 29 must have a way to distinguish what caused it to reset. The ER RESET bit satisfies this requirement. If the ER RESET bit is high, then expiration of the RTC 21 caused the reset. If the ER RESET bit is low, then the user must have manually reset the system by pressing the reset button 13. Depending upon software, the CPU 29 can handle these two possibilities differently, vectoring to error handling routines if failure of the diagnostic routine to execute triggered system reset and perhaps exiting diagnostics entirely if the user reset the system. One way to handle these possibilities is given below in conjunction with FIG. 5.

As mentioned above, the NAND gate 27 sends a reset signal to the CPU 29. This reset signal initiates a restart or reboot of the CPU 29. Conventionally, the CPU 29 receives the reset signal and initiates, via hardware within the CPU 29, a 10 microsecond delay period, within which time the CPU 29 can avoid resetting when the CPU is functioning. For instance, if the CPU 29 continues to function even though the diagnostic routine fails to execute within its alloted time, the CPU 29 can avoid reset and can, instead, vector execution to error handling routines to diagnose the fault. On the other hand, if the CPU 29 is locked up, it is unable to halt the reset, the 10 microsecond delay elapses and the PC is restarted.

Figure 3:
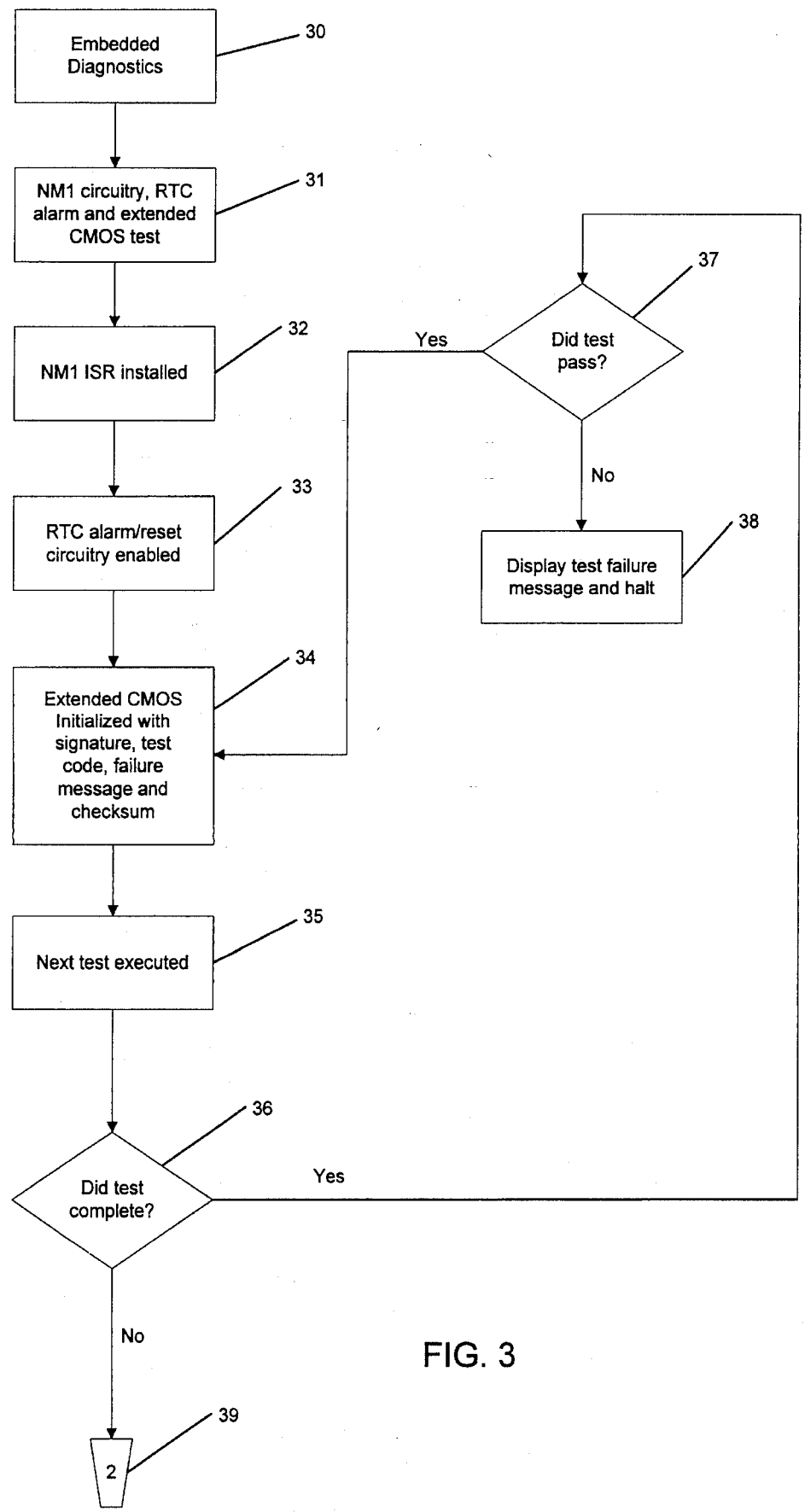
FIG. 3 illustrates a flow diagram of an initial portion of the method of the present invention.

Turning now to FIG. 3, illustrated is a flow diagram of an initial portion of the method of the present invention. Execution begins at block 30, wherein embedded diagnostics is initialized. In a preferred embodiment, the present invention is designed to be used in conjunction with diagnostic routines that are stored in nonvolatile memory within the computer, as opposed to being stored on disk or other secondary media. The present invention is as useful, however, with disk-based diagnostics. Embedded diagnostics requires fewer components to be operating to execute successfully. However, some components do need to function properly for the present invention to operate correctly. In block 31, nonmaskable interrupt ("NMI") circuitry, the RTC 21 alarm and complementary metal oxide semiconductor ("CMOS") random access memory ("RAM") are tested to verify their proper operation.

In block 32, interrupt status routine ("ISR") software for handling NMI signals is installed in CMOS RAM. In block 33, the RTC 21 is enabled by being loaded with a value representing a desired period of time, that period of time being the longest conceivable time the diagnostic routine should take to execute. The ER signal is enabled, allowing the RTC 21 to activate the reset circuit upon expiration. Finally, the RTC 21 is started.

In block 34, a particular diagnostic routine is loaded into memory for execution and the CMOS RAM is initialized with a code representing the identity of the routine, a failure message in case the routine does not complete execution and a checksum value to provide a basis for verifying that the identity of the routine and the failure message are intact upon subsequent retrieval.

In block 35, the diagnostic routine or test is executed. If, in decisional block 36, it is determined that the routine completed execution before expiration of the RTC 21, execution proceeds to decisional block 37. If, in decisional block 37, the diagnostic routine determines the component under test to have passed, execution proceeds to the block 34, wherein the RTC 21 is set to measure another period of time and another diagnostic routine is executed. If the diagnostic routine executes successfully but indicates a failure of the component under test, execution proceeds to block 38, wherein a test failure message is displayed to the user for further analysis.

Figure 4:
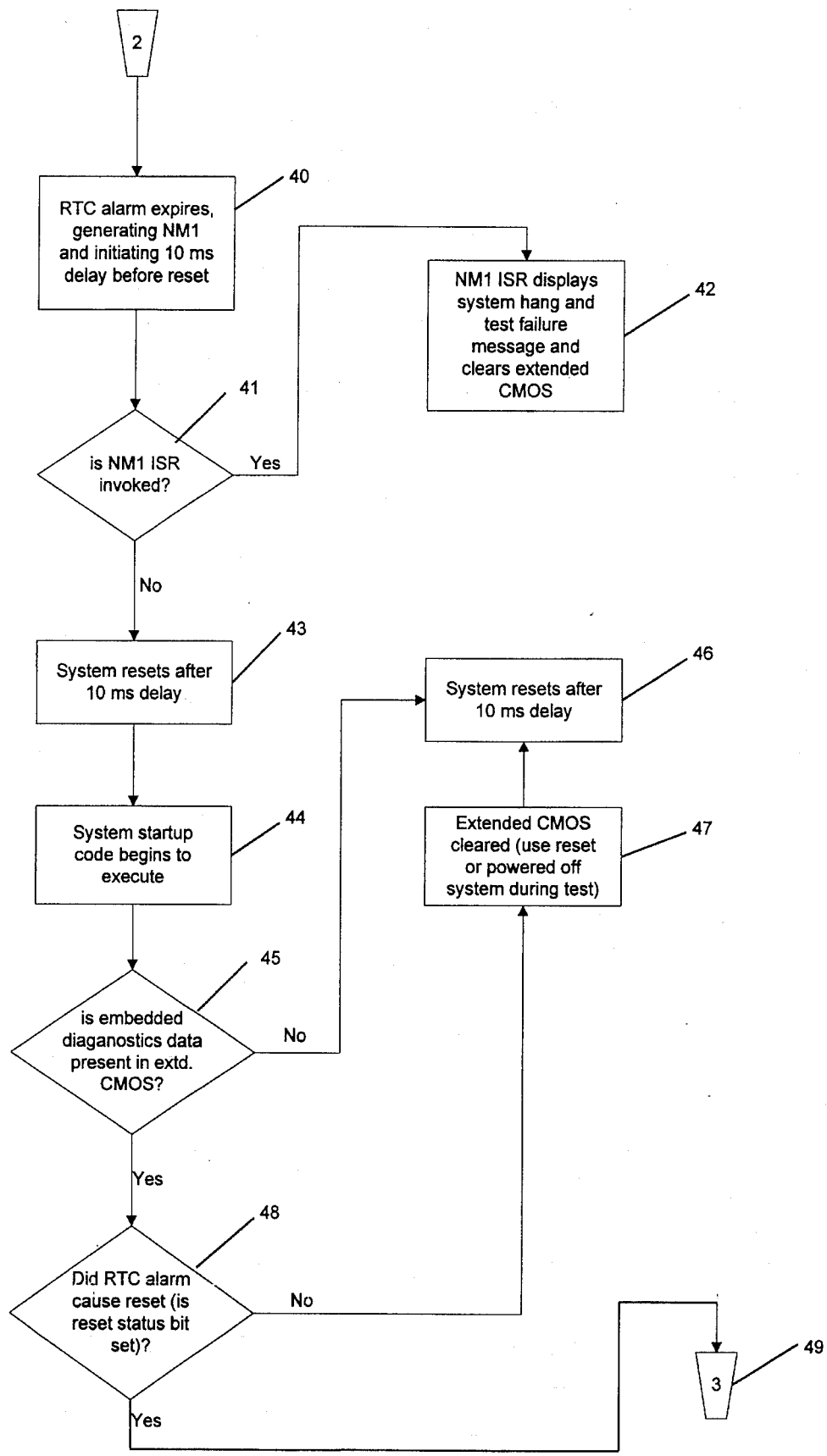
FIG. 4 illustrates a flow diagram of a central portion of the method of the present invention.

If, in the decisional block 36, the diagnostic routine or test failed to complete execution, the process continues, via block 39, to FIG. 4.

Turning now to FIG. 4, illustrated is a flow diagram of a central portion of the method of the present invention. The process of FIG. 4 is entered only if the diagnostic routine being executed fails to fully execute. Execution begins at block 39, from FIG. 3 and proceeds to block 40, wherein the RTC 21 alarm eventually expires, generating a signal on IRQ8 and, by virtue of the ER bit having been enabled low, generating a signal from the OR gate 24 into the reset circuit 28B. The NAND gate 27 generates a reset signal to the CPU 29, starting the 10 microsecond delay period.

If, in a decisional block 41, the CPU 29 continues to function and can invoke the NMI ISR, execution proceeds to block 42, wherein the NMI ISR retrieves the test identifier and error message from the CMOS RAM, displaying the error message and clearing the CMOS RAM of the test identifier and the error message to prevent an erroneous subsequent indication of the existence of an error.

If, on the other hand, the CPU 29 is locked up an unable to invoke the NMI ISR, execution proceeds to block 43, wherein the system, including the CPU 29, resets or restarts. In block 43, the reset signal is sent throughout the whole PC, restarting components other than the CPU 29.

Execution next proceeds to block 44, wherein the CPU 29 begins to execute instructions again after having been restarted. In decisional block 45, the CMOS RAM is checked to determine whether a test identifier and error message are present. If not, the system continues to restart or boot normally (block 46). If so, then the status of the ER RESET bit is checked to determine whether expiration of the RTC 21 or user intervention caused the system to reset. If, in decisional block 48, it is determined that the user caused the reset, the CMOS RAM is cleared of the test indentifier and error message (block 47) and the system continues to restart normally (the block 46).

Figure 5:
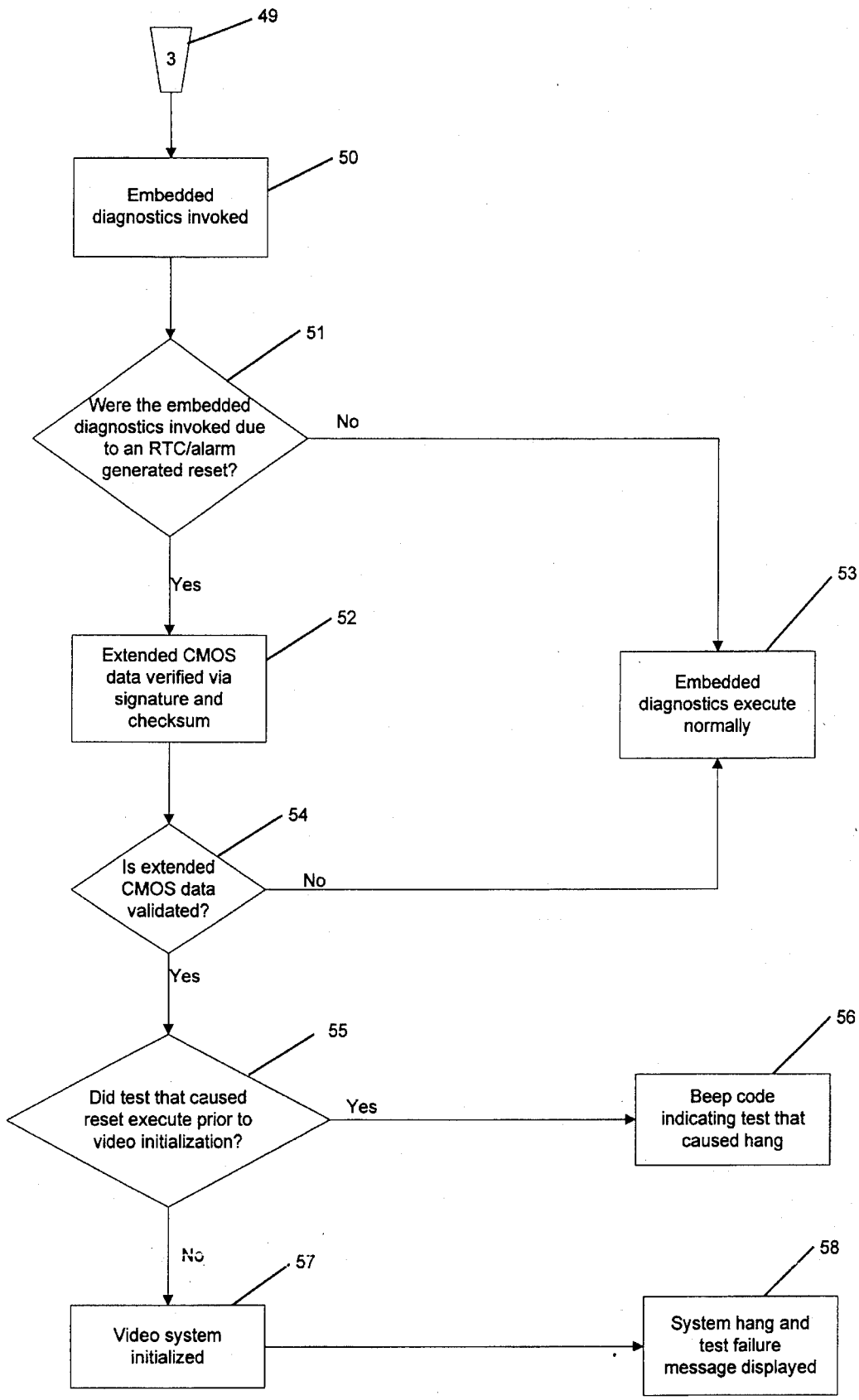
FIG. 5 illustrates a flow diagram of a final portion of the method of the present invention.

If, instead, expiration of the RTC 21 causes the reset, execution proceeds, via block 49, to FIG. 5.

Turning now to FIG. 5, illustrated is a flow diagram of a final portion of the method of the present invention. The process of FIG. 5 is entered only when expiration of the RTC 21 causes reset of the system.

Execution begins at the block 49 from FIG. 4 and proceeds to block 50, wherein embedded diagnostics are envoked upon restart. In decisional block 51, it is determined whether expiration of the RTC 21 invoked embedded diagnostics upon restart. If so, execution proceeds to block 52, wherein the test identifier and error message are read from the CMOS RAM and checksum-verified for accuracy. If not, execution proceeds to block 53, wherein embedded diagnostics proceeds normally, without reading the CMOS RAM to obtain indications of error.

Proceeding from the block 52, at decisional block 54, the validity of the data stored in the CMOS RAM is checked. If, the data is invalid, execution proceeds to the block 53. If the data is valid, then execution proceeds to decisional block 55, wherein it is determined whether the diagnostic routine or test that had failed to execute properly had failed prior to initialization of the video subsystem of the computer. If the video subsystem has not yet been initialized, then it cannot be assumed to be available for display of the error message. In lieu of displaying the error message via the video subsystem, the present invention activates a speaker coupled to the computer to emit a beep therefrom, the beep indicating the presence of an error. This is performed in block 56. If the video subsystem is initialized (block 57), then the error message is displayed on the monitor 11 via the video subsystem for the user's benefit (block 58).

It is apparent from the above that the present invention provides a circuit for providing an automatic hardware reset of a computer system, comprising: (1) a watchdog timer coupled to a CPU within the computer system to enable the watchdog timer to receive a start signal from the CPU indicating that the CPU is beginning execution of a particular task, the watchdog timer beginning to measure a preselected period of time upon receipt of the start signal and generating a timeout signal upon expiration of the preselected period of time and (2) a reset signal generating circuit, capable of receiving the timeout signal from the watchdog timer and providing, in response thereto, a reset signal to a reset circuit coupled to the CPU to thereby allow the reset circuit to initiate a reset of the CPU when the computer system is nonfunctioning.

Although the present invention and its advantages have been described in detail in the foregoing detailed description, those skilled in the art should understand that the detailed description is given by way of illustration only and that various changes, substitutions and alterations can be made herein without departing from the spirit and scope of the invention as defined and limited solely by the appended claims.

What is claimed is:

1. A circuit for resetting a nonfunctioning computer system, comprising:

a watchdog timer coupled to a central processing unit (CPU) within said computer system to enable said watchdog timer to receive a start signal from said CPU indicating that said CPU is beginning execution of a particular task, said watchdog timer beginning to measure a preselected period of time upon receipt of said start signal and generating a timeout signal upon expiration of said preselected period of time;

a reset signal generating circuit for receiving said timeout signal from said watchdog timer and providing, in response thereto, a nonmaskable interrupt signal to said CPU and a reset signal; and a reset circuit coupled to said CPU for receiving the reset signal from the reset signal generating circuit and for transmitting a hardware reset signal to said CPU after a delay period, the delay period allowing said CPU to reset only when said CPU has not responded to the nonmaskable interrupt signal indicating that said CPU is nonfunctioning.

2. The circuit as recited in claim 1 further comprising a circuit for storing data representing whether expiration of said preselected period of time caused said reset of said CPU.

3. The circuit as recited in claim 1 wherein said CPU, after a reset, accesses data representing whether said resetting circuit caused said reset of said CPU.

4. The circuit as recited in claim 1 wherein said preselected period of time is a period of time sufficient to allow said CPU to execute said particular task.

5. The circuit as recited in claim 1 wherein said particular task is a routine for diagnosing a component within said computer system.

6. The circuit as recited in claim 1 wherein said watchdog timer is a real time clock coupled to said CPU.

7. The circuit as recited in claim 1 wherein the hardware reset signal also initiates a power reset of a plurality of components within the computer system other than said CPU.

8. A method of resetting a nonfunctioning computer system, comprising the steps of:

receiving a start signal from a central processing unit (CPU) within said computer system into a watchdog timer, said start signal indicating that said CPU is beginning execution of a particular task;

measuring a preselected period of time with said watchdog timer upon receiving said start signal;

generating a timeout signal with said watchdog timer upon expiration of said preselected period of time;

receiving said timeout signal into a reset circuit coupled to said CPU;

responsive to said timeout signal, transmitting a nonmaskable interrupt signal to said CPU;

determining, upon receipt of the nonmaskable interrupt signal, whether said CPU is nonfunctioning; and after a delay period, providing, with said reset circuit, a hardware reset signal to said CPU in response to said timeout signal to thereby reset said CPU only when said CPU has not responded to the nonmaskable interrupt signal.

9. The method as recited in claim 8 further comprising the step of storing data representing whether expiration of said preselected period of time caused said reset of said CPU.

10. The method as recited in claim 8 wherein said CPU, after a reset, accesses data representing whether said resetting circuit caused said reset of said CPU.

11. The method as recited in claim 8 wherein said preselected period of time is a period of time sufficient to allow said CPU to execute said particular task.

12. The method as recited in claim 8 wherein said particular task is a routine for diagnosing a component within said computer system.

13. The method as recited in claim 8 wherein said watchdog timer is a real time clock coupled to said CPU.

14. The method as recited in claim 8 further including the step of initiating a power reset of a plurality of system components other than said CPU within said computer system when said CPU is nonfunctioning.

15. A circuit for resetting a nonfunctioning computer system, comprising:

a central processing unit (CPU) for transmitting task identification data concerning a particular task said CPU is about to execute to a storage location within said computer system, said CPU further for transmitting a start signal indicating that said CPU is beginning execution of said particular task;

a watchdog timer for receiving said start signal and measuring a preselected period of time in response thereto, said watchdog timer further for generating a timeout signal upon expiration of said preselected period of time, said timeout signal indicating that said particular task has not been executed successfully;

a reset signal generating circuit for receiving said timeout signal and, in response thereto, transmitting a nonmaskable interrupt signal to said CPU and providing a reset signal to a reset circuit within said CPU, said reset signal generating circuit also for transmitting timeout data to said storage location, said timeout data indicating that expiration of said period of time caused said reset of said CPU; and a reset circuit within said CPU for receiving said reset signal from the reset signal generating circuit, delaying for a period of time to allow said CPU, responsive to the receipt of the nonmaskable interrupt signal, to avoid a hardware reset when said CPU is functioning properly, and causing a hardware reset of said CPU when said CPU is nonfunctioning.

16. The circuit as recited in claim 15 wherein said CPU, after a reset, accesses said task identification and timeout data.

17. The circuit as recited in claim 15 wherein said preselected period of time is a period of time sufficient to allow said CPU to execute said particular task.

18. The circuit as recited in claim 15 wherein said particular task is a routine for diagnosing a component within a computer system under control of said CPU.

19. The circuit as recited in claim 15 wherein said watchdog timer is a real time clock coupled to said CPU.

20. The circuit as recited in claim 15 wherein the reset circuit also initiates a power reset of components other than said CPU within said computer system when said CPU is nonfunctioning.

21. A method of resetting a nonfunctioning computer system, comprising:

transmitting task identification data to a storage location within said computer system, the task identification data concerning a particular task a central processing unit (CPU) is about to execute;

transmitting a start signal indicating that said CPU is beginning execution of said particular task from said CPU to a watchdog timer;

receiving said start signal into said watchdog timer;

measuring a preselected period of time in response to receipt of said start signal;

generating a timeout signal with said watchdog timer upon expiration of said preselected period of time, said timeout signal indicating that said particular task has not been executed successfully;

receiving said timeout signal into a reset signal generating circuit, said reset signal generating circuit providing, in response thereto, a reset signal to a reset circuit within said CPU;

receiving the reset signal at the reset circuit within said CPU and attempting to vector said CPU to an error handling routine using a nonmaskable interrupt input;

initiating a hardware reset of said CPU after a delay period when said CPU does not vector to the error handling routine; and transmitting timeout data from said reset signal generating circuit to said storage location, said timeout data indicating that expiration of said period of time caused said reset of said CPU.

22. The method as recited in claim 21 wherein said CPU, after a reset, accesses said task identification and timeout data.

23. The method as recited in claim 21 wherein said preselected period of time is a period of time sufficient to allow said CPU to execute said particular task.

24. The method as recited in claim 21 wherein said particular task is a routine for diagnosing a component within a computer system under control of said CPU.

25. The method as recited in claim 21 wherein said watchdog timer is a real time clock coupled to said CPU.

26. The method as recited in claim 21 wherein the reset circuit also initiates a power reset of components other than said CPU within said computer system when said CPU is nonfunctioning.

27. A personal computer, comprising:

a microprocessor for transmitting identification data concerning a diagnostic routine to be executed to a storage location within said computer, and for transmitting a start signal indicating that said microprocessor is beginning execution of said diagnostic routine;

a real time clock, coupled to said microprocessor for receiving said start signal, said real time clock beginning to measure a preselected period of time sufficient to allow said microprocessor to execute said diagnostic routine, said real time clock also for generating a timeout signal upon expiration of said preselected period of time, said timeout signal indicating that said particular diagnostic routine has not been executed successfully; and hardware reset circuitry coupled to said microprocessor for receiving said timeout signal and, in response thereto, providing a nonmaskable interrupt signal to said microprocessor and, after a delay period, a reset signal to said microprocessor to initiate a hardware reset of said personal computer, said microprocessor avoiding a hardware reset of said personal computer only when said personal computer is functioning properly and allowing a reset of said personal computer when said personal computer system is nonfunctioning, said hardware reset circuitry also for transmitting timeout data to said storage location, said timeout data indicating that expiration of said preselected period of time caused said hardware reset of said personal computer.

28. The computer as recited in claim 27 wherein said preselected period of time is adjustable as a function of an expected length of execution time of said diagnostic routine.

29. The computer as recited in claim 27 wherein said microprocessor accesses said identification and timeout data following said hardware reset.

30. A method of diagnosing a personal computer, comprising the steps of:

transmitting identification data to a storage location within said computer, the identification data concerning a diagnostic routine that a microprocessor within said computer is about to execute;

transmitting a start signal indicating that said microprocessor is beginning execution of said diagnostic routine from said microprocessor to a real time clock;

receiving said start signal into said real time clock;

measuring a preselected period of time in response to receipt of said start signal with said real time clock;

generating a timeout signal with said real time clock upon expiration of said preselected period of time, generation of said timeout signal indicating that said diagnostic routine has not been executed successfully;

transmitting a nonmaskable interrupt signal to said microprocessor responsive to said timeout signal;

after a delay period, transmitting a hardware reset signal from said hardware reset circuitry to said microprocessor;

receiving the hardware reset signal in said microprocessor;

resetting said personal computer when said personal computer is nonfunctioning; and transmitting timeout data from said hardware reset circuitry to said storage location, said timeout data indicating that expiration of said period of time caused said reset of said microprocessor.

31. The method as recited in claim 30 wherein said preselected period of time is adjustable as a function of an expected length of execution time of said diagnostic routine.

32. The method as recited in claim 30 wherein said microprocessor accesses said identification and timeout data following said hardware reset.

\* \* \* \* \*